E. RENARD.
PISTON HEAD.
APPLICATION FILED JUNE 3, 1918.

1,274,783.

Patented Aug. 6, 1918.

Inventor;
Edward Renard,
by his Attorneys,
Howson & Howson

UNITED STATES PATENT OFFICE.

EDWARD RENARD, OF BURNHAM, PENNSYLVANIA.

PISTON-HEAD.

1,274,783.  Specification of Letters Patent.  Patented Aug. 6, 1918.

Application filed June 3, 1918. Serial No. 237,882.

*To all whom it may concern:*

Be it known that I, EDWARD RENARD, a citizen of the United States, and a resident of Burnham, county of Mifflin, State of Pennsylvania, have invented certain Improvements in Piston-Heads, of which the following is a specification.

The object of my invention is to improve the construction of piston heads so that they will resist the high temperatures and to substitute such a head for the one in which leather packings were heretofore used.

Figure 1:
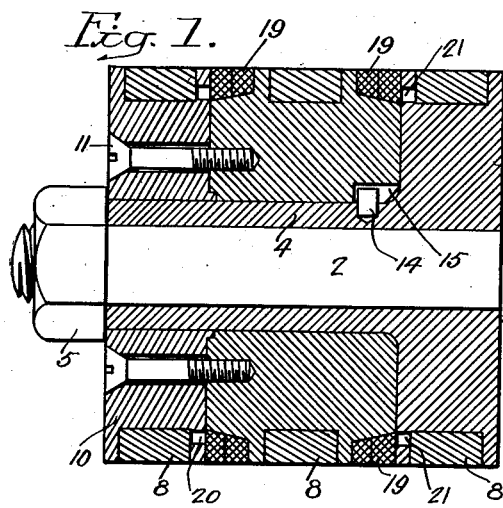
Figure 1 is a longitudinal sectional view of my improved piston head.
Figure 2:
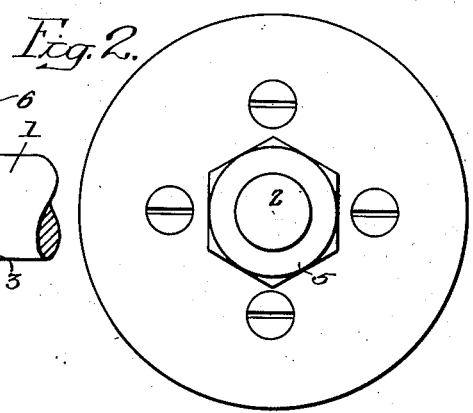
Fig. 2 is an end view.
Figures 3, 4:
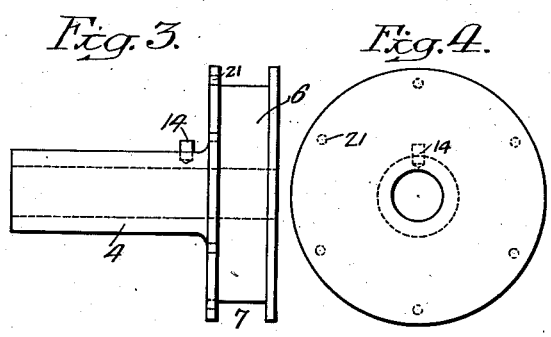
Fig. 3 is a side view of the sleeve.
Fig. 4 is an end view of the same.
Figures 7, 8:
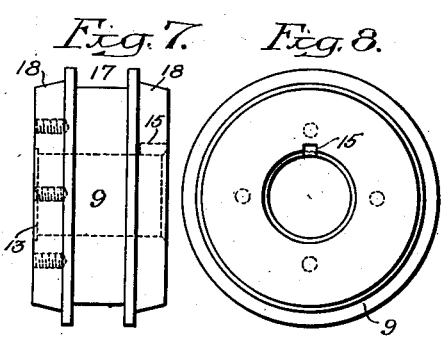
Fig. 7 is a side view of the body section.
Fig. 8 is an end view of the same.
Figures 5, 6:
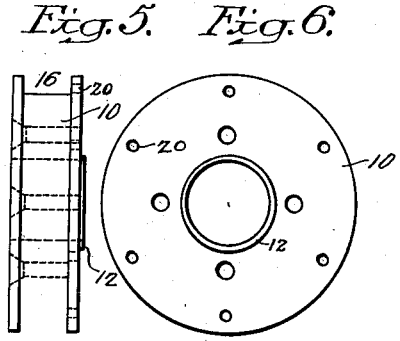
Fig. 5 is a side view of the disk.
Fig. 6 is an end view of the disk.
Figures 9, 10:
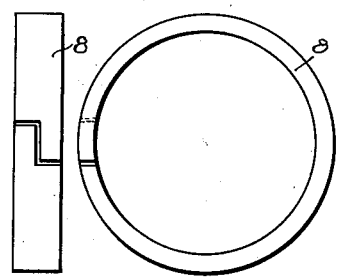
Fig. 9 is a side view of one of the packing rings.
Fig. 10 is an end view of the same.

1 is the piston rod having a reduced portion forming a shoulder 3 against which fits the end of the sleeve 4, which is mounted on the reduced portion and a nut 5 retains this sleeve in position on the rod. The enlarged portion 6 of the sleeve has a peripheral recess 7 for the reception of one of the packing rings 8, as clearly shown in Fig. 1. Mounted on the sleeve 4 is a body portion 9 and secured to the body portion is a disk 10. In the present instance, this disk is held to the body portion 9 by screws 11, as clearly shown in Fig. 1. The disk has a projecting hub 12, which extends into a recess 13 in the body portion. The body portion is prevented from turning on the sleeve by a pin 14, which extends into a notch 15 in the body portion 9, as shown. The nut 5 retains the assembled parts of the piston in place on the rod. The disk 10 has a groove 16 for one of the packing rings 8, which are split, as shown in Fig. 4, and at the center of the body portion is a groove 17 to receive the third packing ring 8. The body portion is reduced at each end and the faces 18 of these reduced portions are beveled, as shown, so that when the parts are assembled two grooves are formed in which rings 19 of superheated steam packings are located. Each ring is shaped to fit the beveled seat, as clearly shown in Fig. 1. In the flanges of the disks adjoining the steam packing is a series of holes 20 and in the disk of the sleeve 4 adjoining the steam packing are holes 21, which are for the purpose of allowing any steam that may pass the rings at either end of the piston to enter under the superheated steam packings and to force the rings out against the walls of the cylinder.

It will be understood that the number of rings may be increased without departing from the essential features of the invention as, in some instances, the piston may be of greater length than that shown in the drawings.

The above described piston is especially applicable for use in air cylinders, but it will be understood that it can be used in connection with any other type of cylinder without departing from the essential features of the invention.

I claim:

1. The combination in a piston, of a sleeve adapted to be mounted on a piston rod and having an enlargement at one end; a disk mounted on the reduced portion of the sleeve; a body section also mounted on said reduced portion between the enlargement of the sleeve and the disk; means for holding the parts together, both the disk and the body portion, as well as the enlargement of the sleeve having annular grooves; and packing in said grooves.

2. The combination in a piston, of a sleeve adapted to be mounted on a piston rod, said sleeve having an enlargement at one end, said enlargement having an annular groove therein; a body portion mounted on the sleeve and of the same diameter as the enlargement of said sleeve, said body portion having an annular groove therein and reduced portions at each end; a disk also mounted on the sleeve and secured to the body portion, said disk being of the same diameter as the body portion and having an annular groove therein; metallic packing rings mounted in the three grooves, the reduced portions of the body forming grooves; and steam packing mounted in said last mentioned grooves.

3. The combination of a piston rod having a reduced portion forming a shoulder; a sleeve mounted on the reduced portion of the rod and having an enlargement at one end, said enlargement having an annular groove therein; a body portion mounted on the sleeve; means for preventing the body portion from turning on the sleeve; a disk also mounted on the sleeve; longitudinal screws passing through the disk and into the body portion for holding the sleeve to the body portion; a nut on one end of the piston rod for holding the assembled parts on the rod; a single groove in each of the parts; a ring in each groove, the body portion having beveled portions at each end forming, with the enlargement of the sleeve and the disk, annular grooves; and steam packing mounted in said last mentioned grooves.

4. The combination in a piston, of a sleeve the length of the piston and adapted to be mounted on a piston rod, said sleeve having a grooved enlargement at one end of the full diameter of the piston; a disk mounted on the opposite end of the sleeve and also the full diameter of the piston; a body portion mounted between the enlargement of the sleeve and the disk, each of these sections having an annular groove therein and a metallic piston ring mounted in each groove, the body portion having beveled reduced portions at each end forming, when the parts are assembled, annular grooves; and steam packing mounted in said grooves; a series of holes in the flanges of the enlargements of the sleeve and the disk which communicate with the space back of the steam packing when the parts are assembled so that any steam escaping around the end of the piston rings will enter back of the packing rings and will tend to force the rings out against the cylinder.

In witness whereof I affix my signature.

EDWARD RENARD.